H. BARBER.
LIQUID DISTRIBUTING APPARATUS.
APPLICATION FILED AUG. 3, 1908.
920,520.
Patented May 4, 1909.
2 SHEETS—SHEET 1.
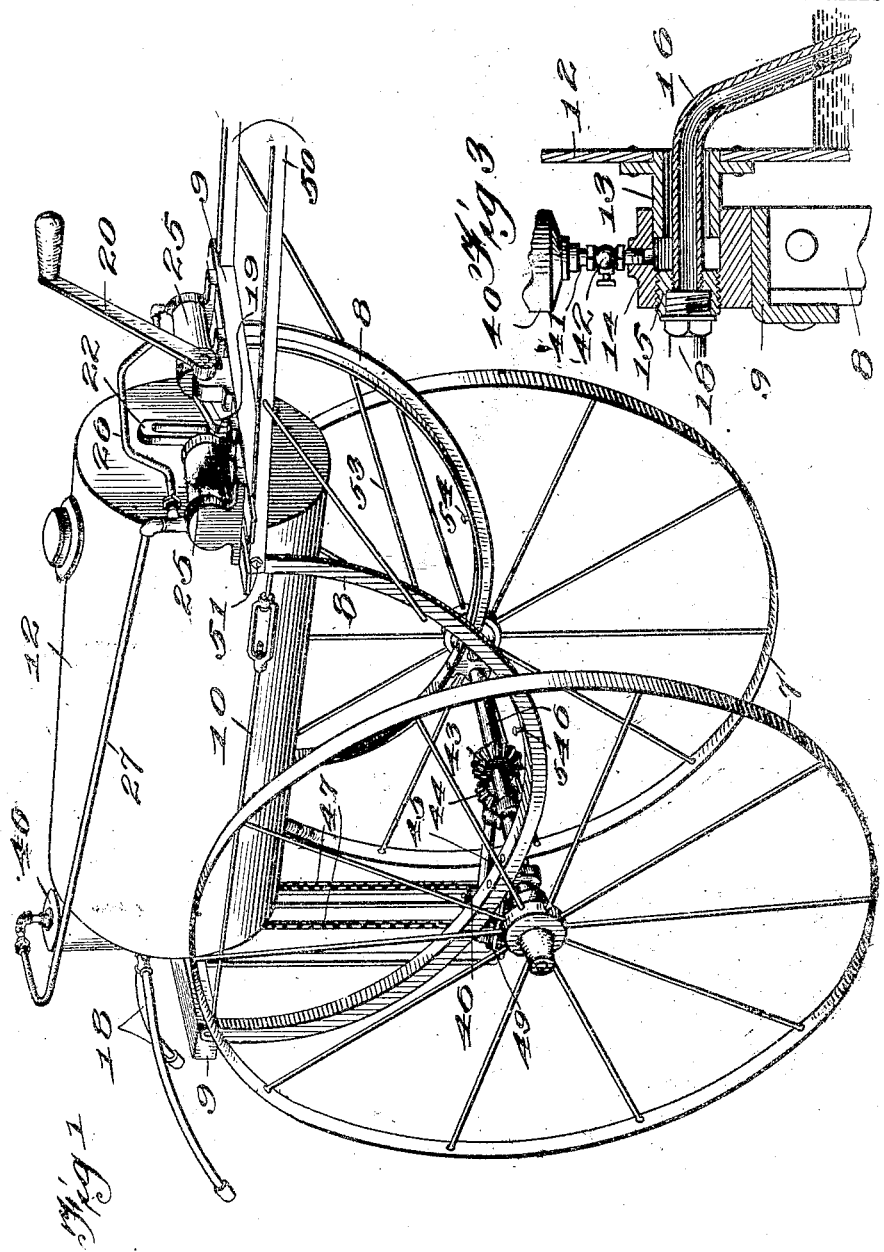
Witnesses
Inventor
Herman Barber.
By
Attorney

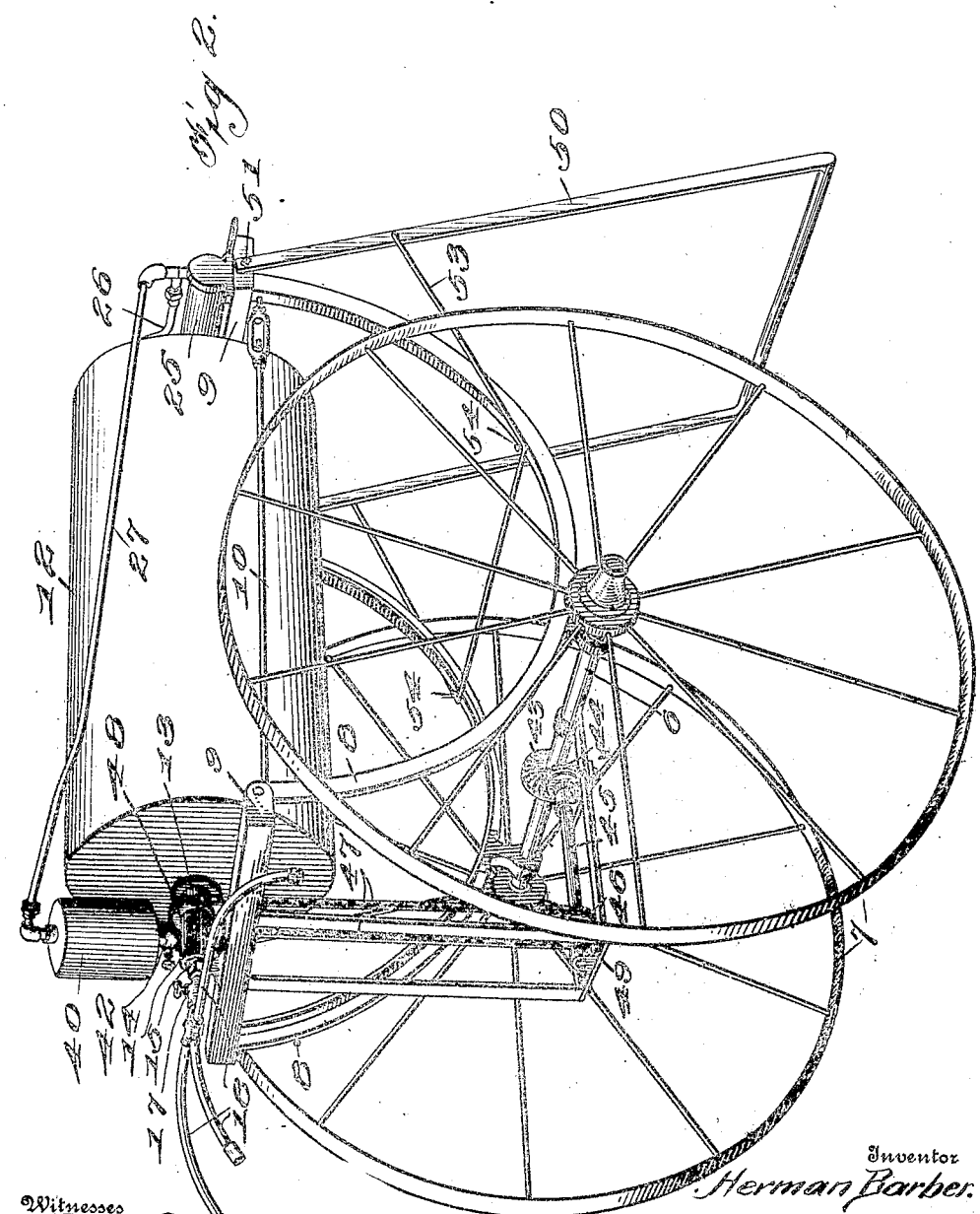

UNITED STATES PATENT OFFICE.

HERMAN BARBER, OF ELWOOD, INDIANA.

LIQUID-DISTRIBUTING APPARATUS.

No. 920,520.  Specification of Letters Patent.  Patented May 4, 1909.

Application filed August 3, 1908. Serial No. 446,711.

*To all whom it may concern:*

Be it known that I, HERMAN BARBER, a citizen of the United States, residing at Elwood, in the county of Madison and State of Indiana, have invented certain new and useful Improvements in Liquid-Distributing Apparatus, of which the following is a specification.

In my Patent, No. 855,496, dated June 4, 1907, a liquid distributing apparatus is disclosed which is adapted for use as a sprayer for liquids of various kinds, and also for use as a chemical fire extinguisher.

The object of the present invention is to improve the construction shown in said patent, and this is particularly done by means of gearing between the axle of the machine and the tank, which serves to rotate the tank when the machine is being hauled, and which also serves to pump up the pressure necessary to discharge the liquid.

The nature of the improvements will be more fully apparent from the following description and the accompanying drawings in which—

Figure 1 is a perspective view of the machine in one position, showing the front end particularly; Fig. 2 is a perspective view showing the rear end of the machine; Fig. 3 is a detail in section showing particularly the connection between the acid holder and the main tank.

Referring specifically to the drawings, the frame of the device consists of an axle 6, wheels 7, one of which is loose on the axle and the other of which is fast thereon, and curved side bars 8 connected at opposite ends by cross bars 9. Truss rods 10 are connected across from one end of the side bars to the other, substantially as and for the purpose described in my former patent.

The cylindrical main tank 12 is mounted upon trunnions between the cross bars 9. The trunnion 13 at one end is hollow and rests in a bearing box 14 mounted upon one of the cross bars 9. The bearing box is threaded to receive the coupling 15 which screws therein. This coupling carries a curved discharge pipe 16 which reaches to near the bottom of the tank. The coupling 15 is connected to delivery pipes 18, a stop cock 17 being provided to control the flow. The trunnion at the front or opposite end of the tank is extended and bent to form a crank 19 which may be provided with a handle 20, said crank being carried in bearings upon the cross bars 9 at that end. The crank works in a slotted link 22 which operates the pistons of pumps 25 in a manner similar to that described in the above mentioned patent, the pumps being operated when the tank is rotated. Said pumps are connected by pipes 26 and 27 to the top of a small tank or acid holder 40 which has an outlet pipe 41 at the bottom provided with a cock 42 and tapped into the bearing box 14, so that acid may flow from the holder into the bearing box and thence through the hollow trunnion 13 into the large tank.

In order to rotate the tank when the machine is being pulled, gearing is provided consisting of a beveled gear 43 on the axle which meshes with a beveled gear 44 at one end of an inwardly extending shaft 45 which has a sprocket wheel 46 connected by chain belt 47 to a sprocket wheel 48 on the trunnion 13. The shaft and parts thereof are supported by a bracket 49 connected to the axle and to the rear cross bar 9. Obviously when the machine is hauled along the ground the gearing will cause the tank to rotate.

At the front of the machine is a rectangular frame or bar 50, pivoted at its ends, as indicated at 51, to the frame of the machine. This serves as a handle to pull the machine along, and also serves to support the same in upright position, as shown in Fig. 2, being then dropped to the ground, and caught by a bail 53 attached thereto and arranged to engage over pins 54 on the side bars 8.

When the machine is moving the tank is rotated by the means described, and the pumps are also worked, which pumps up pressure in the tank 40 and by opening the stop cock 42 the acid in the holder will be forced into the large tank which will contain a solution of soda, for the production of the ordinary fire extinguishing compound; and the air pressure will follow the acid into the large tank, causing a pressure therein which, when the fire is reached, will be sufficient to force the liquid contents of the tank out through the delivery holes or pipe. For use as an ordinary sprinkler, the acid is omitted, and the pressure is then pumped through the acid holder and into the large tank, for the purpose of discharging any liquid therein, as for example, when the device is used as a sprayer for white wash or for spraying poisonous or other compounds on plants or trees. The rotation of the large tank serves to thoroughly mix whatever ingredients the liquid may contain, and as the machine is drawn along the air pressure is constantly pumped up in the tank, for the purpose intended. For use with a fire extinguishing compound, it will therefore be unnecessary to delay while the pump is being operated, and for other uses the ordinary movement of the machine will, in consequence of the gearing, keep sufficient pressure supplied, although, if necessary, the pumps may be operated by the handle 20, as in the patented machine.

I claim:

1. In a liquid distributing apparatus, in combination, a wheeled frame, a rotatable mixing tank, and an air pump mounted on said frame, a pipe leading from the pump to the tank, and wheel-driven means for operating the pump and rotating the tank.

2. In a liquid distributing apparatus, in combination, a frame, a mixing tank rotatably mounted in said frame, an air pump at one end of the tank, a crank connection between the pump and the tank, and means independent of said tank to rotate the tank, whereby the pump is operated when the tank is rotated, the pump having a delivery pipe leading into the tank.

3. In a liquid distributing apparatus, in combination, a frame, a rotatable tank having trunnions mounted in bearings on the frame, one of the trunnions being hollow and the other having a crank thereon, an air pump on the frame, and operatively connected to the crank, an acid holder having a pipe connection to the hollow trunnion, an air supply pipe leading from the pump to the acid holder, and a discharge pipe leading from the tank through the hollow trunnion.

4. In a liquid distributing apparatus, in combination, a tank, an acid holder having a pipe connection thereto, an air pump connected to the holder and arranged to force air through the same and into the tank, means to operate the pump, and a discharge pipe from the tank.

In testimony whereof, I affix my signature in presence of two witnesses.

HERMAN BARBER.

Witnesses:
F. P. ENGLE,
I. N. ROOP.